United States Patent
Sautel et al.

(10) Patent No.: US 9,587,113 B2
(45) Date of Patent: Mar. 7, 2017

(54) GRANULES COMPRISING BITUMEN AND A THERMOPLASTIC POLYURETHANE ELASTOMER, METHOD FOR ITS PREPARATION AND ITS USES

(71) Applicant: SOPREMA, Strasbourg (FR)

(72) Inventors: Henri Sautel, Saint Just Chaleyssin (FR); Pierre-Etienne Bindschedler, Obernai (FR); Rémi Perrin, Boersch (FR)

(73) Assignee: Soprema, Strasbourg (FR)

( * ) Notice: Subject to any disclaimer, the term of this patent is extended or adjusted under 35 U.S.C. 154(b) by 181 days.

(21) Appl. No.: 14/530,258

(22) Filed: Oct. 31, 2014

(65) Prior Publication Data

US 2015/0291798 A1  Oct. 15, 2015

(30) Foreign Application Priority Data

Nov. 5, 2013 (FR) ..................... 13 60831

(51) Int. Cl.

| C08L 95/00 | (2006.01) |
| C10C 3/14 | (2006.01) |
| B29B 9/12 | (2006.01) |
| C08G 18/48 | (2006.01) |
| C08G 18/66 | (2006.01) |
| C08G 18/76 | (2006.01) |
| C08G 18/08 | (2006.01) |
| C08G 18/32 | (2006.01) |
| C08G 18/36 | (2006.01) |
| C08G 18/42 | (2006.01) |
| C08L 75/06 | (2006.01) |
| C08L 75/08 | (2006.01) |
| D06N 5/00 | (2006.01) |
| B29B 9/06 | (2006.01) |

(52) U.S. Cl.

CPC ............... *C08L 95/00* (2013.01); *B29B 9/12* (2013.01); *C08G 18/0895* (2013.01); *C08G 18/3206* (2013.01); *C08G 18/36* (2013.01); *C08G 18/4288* (2013.01); *C08G 18/4854* (2013.01); *C08G 18/664* (2013.01); *C08G 18/7657* (2013.01); *C08L 75/06* (2013.01); *C08L 75/08* (2013.01); *C10C 3/14* (2013.01); *D06N 5/003* (2013.01); *B29B 9/06* (2013.01); *C08L 2205/22* (2013.01); *C08L 2555/80* (2013.01)

(58) Field of Classification Search
None
See application file for complete search history.

(56) References Cited

U.S. PATENT DOCUMENTS

| 1,951,769 A | * | 3/1934 | Pearson | ............... C10C 3/14 165/91 |
| 2005/0101210 A1 | * | 5/2005 | Bindschedler | ........ C09D 195/00 442/136 |
| 2008/0210127 A1 | | 9/2008 | Bindschedler | |

FOREIGN PATENT DOCUMENTS

| EP | 0922552 A1 | 6/1999 |
| WO | 9703253 A1 | 9/1997 |
| WO | 2011104224 A1 | 9/2011 |

OTHER PUBLICATIONS

Search Report INPI of France, dated Aug. 22, 2014.

* cited by examiner

*Primary Examiner* — Randy Gulakowski
*Assistant Examiner* — Christopher M Rodd
(74) *Attorney, Agent, or Firm* — McDonnell Boehnen Hulbert & Berghoff (57) ABSTRACT

Disclosed are granules comprising an elastomeric polyurethane and bitumen, processes for preparing the granules in an extruder and to their use for preparing a bituminous binder, which may especially be used for producing prefabricated sealing membranes by depositing said bituminous binder onto a fibrous support.

15 Claims, 2 Drawing Sheets

GRANULES COMPRISING BITUMEN AND A THERMOPLASTIC POLYURETHANE ELASTOMER, METHOD FOR ITS PREPARATION AND ITS USES

BACKGROUND OF THE INVENTION

Field of the Invention

The present invention relates to a granule comprising a thermoplastic elastomeric polyurethane and bitumen, to the process for preparing it in an extruder and to a process for preparing a bituminous binder using said granule, which may especially be used for producing prefabricated sealing membranes by depositing said bituminous binder onto a fibrous support.

Description of Related Art

Membranes based on bitumen modified with polymers of the SBS (styrene-butadiene-styrene) or APP (atactic polypropylene) type have been known for many years, and have been widely developed since the 1970s in the sector of leakproofing terrace roofs.

Modification of direct distillation bitumens obtained from refineries is a necessity. Indeed, standard bitumens, used especially in the road industry, have softening points at temperatures of about 40° C. and are as hard and brittle as glass for temperatures typically below −5° C.

Now, these working temperatures are too limiting for use on roofs, where the temperature range may vary between −40° C. and 110° C. depending on the climate.

It is thus necessary to modify the bitumen. The standard techniques consist in adding to the bitumen thermoplastic polymers of block elastomer type [SBS, SEBS (styrene-ethylene-butadiene-styrene)] or plastomers [polyolefin such as APP, EVA (ethylene-vinyl acetate), IPP (isotactic polypropylene) or AAPO (amorphous alpha-polyolefin)].

Thus, via SBS modification, it is possible to obtain a bituminous binder with a softening point of about 125° C. and flexibility at low temperatures of about −30° C. The working range of a binder modified with plastomeric polymers is generally between −15° C. and 150° C.

However, membranes prepared with a bituminous binder modified with the abovementioned polymers have their limits:
  SBS polymers are UV-sensitive and, as a result, the final layer (apparent layer) requires additional specific protection against UV attack;
  plastomeric polymers have mediocre flexibility at low temperatures and the membrane seals produced with binders containing these polymers do not exhibit satisfactory heat-resistance.

The additional specific protection against UV attack, when it is integrated into the prefabricated membrane, is currently produced either with metal strips (aluminum, copper or stainless steel) or with slate or mica flakes or granules sprinkled onto the surface during the manufacturing process. These protections called "self-protections" lead to an excess weight that may be up to 1.5 kg/m², representing up to 30% of the weight of the membrane and increase the cost price of the final membrane.

Besides UV, these abovementioned known products age rapidly relative to the lifetime of the structures onto which they are applied and degrade by oxidation, preventing valid leakproofing over a long period. Restoring the leakproofing is in fact performed on average every 15-20 years.

Polyurethane modified bituminous coatings have been developed in recent years. These products especially find an application in road coverings and the leakproofing of artworks and buildings. Known products of this type are either:
  cold-applied: the product is in liquid one-pack or two-pack form, and acquires its characteristics after the crosslinking which takes place in the open air;
  hot-applied: the polymerization-crosslinking takes place in the hot bitumen just before its application on the worksite.

For example, French patent application No. 2 064 750 in the name of NAPHTACHIMIE describes a thermoplastic bituminous binder containing less than 10% by weight of thermosetting polyurethane. The polyols used for synthesizing the polyurethane have functionalities of greater than 2, which may be up to 8, and the NCO/OH ratio is between 1 and 2 and preferably in the region of 1.1. This bituminous binder has thermoplastic properties due to the low proportion of polyurethane and may be applied onto a fibrous support to make a prefabricated membrane. However, the low percentage of polyurethane introduced does not make it possible to obtain membranes that are sufficiently elastic and resistant.

Moreover, European patent application No. 1 013 716 in the name of the Applicant discloses a one-pack liquid composition based on bitumen and polyurethane prepolymer which polymerizes directly on the support to be rendered leaktight when it is cold-applied on the worksite. Thus, this bituminous composition is not thermoplastic and is not intended for the preparation of prefabricated membranes in a factory.

Patent application WO 97/03253 in the name of INTERFACE, INC. discloses a sheet material intended to form a barrier against moisture and comprising a layer of a bitumen/polyurethane mixture protected with a polymer film and covered with a detachable film. The polyurethane used in the bituminous mixture is prepared with a polybutadiene polyol having a functionality of between 2.2 and 2.6. Thus, the resulting polyurethane is thermosetting and sensitive, by virtue of its chemical nature, to UV-mediated degradation, hence the need to protect the bituminous layer with a polymer film. The material of this patent application is not thermoplastic and it is cold-applied to the surface to be rendered leaktight and held in place by the adhesive power of the bituminous composition, optionally improved by the addition of a particular adhesive agent.

The Applicant described, in French patent application No. 2 844 283, a prefabricated sealing membrane based on a bituminous binder modified with a thermoplastic polyurethane having the following formulation, the percentages being weight percentages based on the total weight of the composition:
  40% to 90% of bitumen,
  10% to 50% of thermoplastic polyurethane,
  0 to 10% of aromatic oil,
  0 to 50% of fillers, and
  0 to 0.5% of catalyst.

The process for preparing the bituminous binder consists in synthesizing the thermoplastic polyurethane in situ in the hot bitumen. The obtained bituminous binder is then applied as a layer onto a fibrous support, for example by coating and then calendering, to give a prefabricated sealing membrane that may especially be used for leakproofing roofs.

However, the in situ polymerization of the polyurethane in hot bitumen described in this patent application is complicated from an industrial viewpoint. Specifically, certain bitumens cannot be used since they are incompatible with the synthesized polyurethanes. Furthermore, the bitumen must necessarily be heated in order to become liquid and the polyurethane bond formed during polymerization is reversible at temperatures of about 150° C., which degrades the quality of the polyurethane. Furthermore, the viscosity of the constituents requires proceeding via an additional step of synthesizing a quasi prepolymer. Finally, once the in situ synthesis is complete, the final viscosity of the bituminous binder is high and requires specific pumps.

SUMMARY OF THE INVENTION

After extensive research, the Applicant has found that it is possible to overcome the drawbacks of the abovementioned process by preparing solid granules comprising a thermoplastic elastomeric polyurethane synthesized in the presence of bitumen by reactive extrusion. The granules of the present invention make it possible to prepare a bituminous binder using a wider variety of bitumens, including bitumens that are incompatible with thermoplastic polyurethanes, especially such as bitumens with a very high content of asphaltenes (typically >25% by weight based on the weight of the bitumen). Indeed, in the granule of the invention, the thermoplastic polyurethane of the granule is precompatibilized with bitumen during its synthesis. As a result, the granule may be mixed in a bitumen that is known to be incompatible with the polyurethane without, however, this incompatibility posing problems. This compatibilization, due to the granules, also makes it possible to accelerate the dispersion of the polyurethane in the bitumen of the bituminous binder, which advantageously reduces the preparation time required to obtain a homogeneous bituminous binder when compared with the synthesis of the polyurethane in hot bitumen as described in French patent application No. 2 844 283. Another advantage associated with the use of the granule of the present invention is that the polyurethane dispersed in the bituminous binder is of very good quality. Indeed, since the reactive extrusion used for synthesizing the granule is very rapid, the polyurethane obtained is very stable and there is no risk of the urethane bond breaking. Moreover, since the granules of the present invention are solid, they are easy to store and to transport and may thus be used well after their preparation on sites where the available bitumens are of moderate quality. This also makes it possible to reduce the amounts of hot liquid bitumen to be transported. One of the other advantages of the present invention consists of the use of standard blenders for preparing the binder instead of the use of a reactor/blender.

An object of the present invention is thus a granule comprising a thermoplastic elastomeric polyurethane and bitumen in which said thermoplastic elastomeric polyurethane is obtained by reaction between:
  a polyol having a functionality of between 1.75 and 2.2, preferably between 1.85 and 2.1 and more preferentially between 1.95 and 2.05 and a molar mass of between 500 and 6000 g/mol, preferably between 900 and 5000 g/mol and more preferentially between 1500 and 3500 g/mol;
  a diisocyanate; and
  a chain-extending diol with a molar mass of less than 500 g/mol, preferably less than 400 g/mol, more preferentially less than 300 g/mol; with an NCO/OH ratio of between 0.9 and 1.02, preferably between 0.95 and 1 and more preferentially between 0.97 and 0.99.

Another object of the invention is a process for preparing a granule comprising a thermoplastic elastomeric polyurethane and bitumen, said polyurethane being obtained by polymerization reaction between:
  a polyol having a functionality of between 1.75 and 2.2, preferably between 1.85 and 2.1 and more preferentially between 1.95 and 2.05 and a molar mass of between 500 and 6000 g/mol, preferably between 900 and 5000 g/mol and more preferentially between 1500 and 3500 g/mol;
  a diisocyanate; and
  a chain-extending diol with a molar mass of less than 500 g/mol, preferably less than 400 g/mol and more preferentially less than 300 g/mol;
  with an NCO/OH ratio of between 0.9 and 1.02, preferably between 0.95 and 1 and more preferentially between 0.97 and 0.99;
  said polymerization reaction being performed in an extruder in the presence of bitumen.

The invention also pertains to the use of the granule according to the invention for the preparation of a bituminous binder. An object of the invention is thus a process for preparing a bituminous binder, comprising the incorporation of the granules according to the invention into a composition comprising liquid bitumen and optionally a compound chosen from an oil, a filler, an additive and a catalyst.

Finally, the invention also pertains to the use of the bituminous binder according to the invention for the preparation of a prefabricated sealing membrane. An object of the invention is thus a process for preparing a prefabricated sealing membrane, comprising depositing the bituminous binder according to the invention onto a fibrous support

DETAILED DESCRIPTION OF THE INVENTION

Bitumen and Thermoplastic Polyurethane Granule

The granule of the present invention comprises a thermoplastic elastomeric polyurethane and bitumen. The granule may further comprise a catalyst, additives and fillers.

The granules according to the invention are constituted of a homogeneous mixture of bitumen and of thermoplastic elastomeric polyurethane macromolecules.

For the purposes of the present invention, the term "homogeneous mixture" means an absence of regions that are highly concentrated in bitumen or in polyurethane.

According to a particular embodiment, the granule of the present invention comprises:
  from 5 to 70%, from 10% to 70%, from 15% to 50%, from 20% to 40% by weight of bitumen relative to the weight of the granule;
  from 95 to 30%, from 90% to 30%, from 85% to 50%, from 80% to 60% by weight of thermoplastic elastomeric polyurethane relative to the weight of the granule.

According to a preferred embodiment, the granule of the present invention comprises:
  from 10 to 15% by weight of bitumen relative to the weight of the granule;
  from 90 to 85% by weight of thermoplastic elastomeric polyurethane relative to the weight of the granule.

The bitumen included in the granule of the present invention is advantageously a direct distillation bitumen, also known as a pure bitumen. Examples of bitumens that may be used are the bitumens of grades 70/100 and 160/220, the grades being defined according to the penetrability of a needle into 100 g of bitumen at 25° C. after 5 seconds, expressed in $1/10^{th}$ of mm and measured according to standard EN 1426 of June 2007.

The granule of the present invention also comprises a thermoplastic elastomeric polyurethane.

For the purposes of the present invention, the term "thermoplastic" means a material which softens under the action of heat and which hardens on cooling, reversibly and without loss of properties.

For the purposes of the present invention, the term "elastomer" means a material which is capable of undergoing a large elastic deformation, i.e. which is capable of returning to its initial form when the deformations cease.

The thermoplastic elastomeric polyurethane comprised in the granule of the present invention may especially be obtained by polymerization of three compounds: (i) a polyol having a functionality of between 1.75 and 2.2, preferably between 1.85 and 2.1 and more preferentially between 1.95 and 2.05 and a molar mass of between 500 and 6000 g/mol, preferably between 900 and 5000 g/mol and more preferentially between 1500 and 3500 g/mol, (ii) a diisocyanate and (iii) a chain-extending diol, in specific proportions.

Thus, the NCO/OH ratio of the three compounds used to synthesize the thermoplastic elastomeric polyurethane is between 0.9 and 1.02, preferably between 0.95 and 1 and more preferentially between 0.97 and 0.99. Indeed, if the NCO/OH ratio is greater than 1.02, a branched polyurethane is obtained, which decreases the thermoplasticity and the miscibility with bitumen. If the NCO/OH ratio is less than 0.9, a polyurethane with an excessively low molar mass is obtained, which leads to a reduction of the melting point.

For the purposes of the present invention, the term "functionality" means the total number of reactive hydroxyl functions per mole of polyol.

The polyol according to the invention has a hydroxyl number ($I_{OH}$) which is directly linked to the functionality and to the molar mass of said polyol and may be calculated with the following formula.

$I_{OH}$=(functionality of the polyol×56109.37)/molar mass of the polyol

The hydroxyl number corresponds to the number of mg of KOH necessary to neutralize an acid or an anhydride which combines with one gram of polyol.

Thus, according to one embodiment, the polyol has a hydroxyl number of between 18 mg KOH/g and 224 mg KOH/g and preferentially between 32 mg KOH/g and 75 mg KOH/g.

The hydroxyl number may be determined by back-titration using potassium hydroxide.

According to the invention, the molar mass of the polyol may be determined by various methods such as liquid-phase chromatography (THF) or steric exclusion chromatography.

Thus, once the hydroxyl number and the molar mass of the polyol have been determined, it is possible to determine the functionality value of the polyol.

Conversely, once the functionality and the molar mass of the polyol have been determined, it is possible to determine the hydroxyl number.

For the purposes of the present invention, the term "NCO/OH ratio" means the stoichiometric ratio between the number of NCO functions of the diisocyanate and the number of OH functions of the polyol and of the chain-extending diol. The NCO/OH ratio is calculated with the following formula:

NCO/OH Ratio=$(m_{exp\ diiso} \times EM_{diiso})/(m_{exp\ polyol} \times EM_{polyol})$ in which:

$m_{exp\ diiso}$ is the mass of the diisocyanate;

$m_{exp\ polyol}$ is the total mass of the polyols and chain-extending diols;

$EM_{polyol}$ is the equivalent total mass of the polyols and chain-extending diols and corresponds to the ratio between the total molar mass of the polyols and chain-extending diols and the functionality of the polyols and chain-extending diols;

$EM_{diiso}$ is the equivalent mass of the diisocyanate and corresponds to the ratio between the molar mass of the diisocyanate and the functionality of the diisocyaante.

For the purposes of the present invention, the term "functionality of the diisocyanate" means the total number of reactive isocyanate functions per mole of isocyanate.

The polyol included in the synthesis of the thermoplastic elastomeric polyurethane of the present invention has a functionality of between 1.75 and 2.2, preferably between 1.85 and 2.1 and more preferentially between 1.95 and 2.05 and a molar mass of between 500 and 6000 g/mol, preferably between 900 and 5000 g/mol and more preferentially between 1500 and 3500 g/mol.

According to a preferred embodiment, the polyol has a mean functionality of 2.

Said polyol may especially be chosen from a polyether polyol, a polyester polyol, a polycarbonate polyol, a polyolefin polyol, a polyol based on plant oil, and mixtures thereof. Preferably, the polyol is chosen from a polyether polyol, a polyester polyol, a polyolefin polyol, and mixtures thereof.

The polyether polyols are obtained by polymerization by opening a cyclic ether such as ethylene oxide, propylene oxide or tetrahydrofuran. Examples of polyether polyols that may be used in the present invention are poly(ethylene glycol) of formula poly(propylene glycol) of formula and poly(tetramethylene glycol) of formula Polyester polyols are obtained by reaction between a dicarboxylic acid and a diol or by reaction between a cyclic ester and a diol. Examples of dicarboxylic acids that may be used are succinic acid, glutamic acid, octanedioic acid, sebacic acid, maleic acid, fumaric acid, phthalic acid, isophthalic acid and terephthalic acid. The dicarboxylic acid is advantageously a dicarboxylic fatty acid, i.e. a saturated or unsaturated aliphatic dicarboxylic acid comprising from 8 to 44 carbon atoms between the acid functions, which may be synthesized, for example, by dimerization of unsaturated aliphatic monocarboxylic acids or of unsaturated aliphatic esters containing between 8 and 22 carbon atoms such as linoleic acid and linolenic acid. An example of a cyclic ester that may be used is caprolactone. Examples of diols that may be used are ethanediol, diethylene glycol, 1,2-propanediol, 1,3-propanediol, dipropylene glycol, 1,4-butanediol, 1,5-pentanediol, 1,6-hexanediol, 1,10-decanediol, glycerol, trimethylolpropane, tripropylene glycol, tetraethylene glycol, tetrapropylene glycol, tetramethylene glycol and 1,4-cyclohexanedimethanol. Examples of polyester polyols that may be used in the present invention are poly(ethylene adipate) of formula poly(caprolactone diol) of formula or the polyester polyol based on fatty acid dimers In the formulae of the various polyols given in the present patent application, the values of n, m, a and d will be chosen by a person skilled in the art so as to satisfy especially the required molar mass.

The polycarbonate polyols are obtained by reaction between a diol and phosgene, a chloroformate, a dialkyl carbonate or a diallyl carbonate. Diols that may be used are ethanediol, diethylene glycol, 1,3-butanediol, 1,4-butanediol, 1,6-hexanediol, 2-methyl-1,3-propanediol, 2,2-dimethyl-1,3-propanediol and 1,5-pentanediol. An example of a polycarbonate polyol that may be used in the present invention is 2-methyl-1,3-propanediol polycarbonate of formula The polyolefin polyols are obtained by polymerization of an olefin in the presence of an initiator comprising a protected alcohol function. Examples of polyolefin polyols that may be used in the present invention are polyisobutylene diols, polyisoprene diols and polybutadiene diols such as those sold under the trade name KRASOL® or Poly bd® by Cray Valley. Hydrogenated polyolefin polyols, such as hydrogenated polyisobutylene diols, hydrogenated polyiso-prene diols and hydrogenated polybutadiene diols are also included in the polyolefin polyols that may be used in the present invention.

According to a preferred embodiment, the polyol used to synthesize the thermoplastic elastomeric polyurethane of the present invention is relatively apolar. For the purposes of the present invention, the term "relatively apolar" means that the polyol comprises at least one saturated or unsaturated hydrocarbon-based chain optionally interrupted with one or more ether (—O—), ester (—CO—O—) or carbonate (—O—CO—O—) functions, and mixtures thereof, said chain containing at least 20, preferably at least 30 and more preferentially at least 40 carbon atoms between two hydroxyl functions. According to a particularly preferred embodiment, said hydrocarbon-based chain is not substituted with halogenated, nitrogenous or hydroxylated groups.

The diisocyanate used to synthesize the thermoplastic elastomeric polyurethane of the present invention contains two NCO functions. Said diisocyanate may be chosen especially from aromatic, aliphatic and cycloaliphatic diisocyanates, and mixtures thereof. Preferably, the diisocyanate is an aromatic diisocyanate.

Examples of aromatic diisocyanates that may be used in the present invention are toluene diisocyanate (TDI) isomers such as 2,4-toluene diisocyanate, 2,6-toluene diisocyanate, and isomeric mixtures thereof, diphenylmethane diisocyanate (MDI) isomers such as 2,2'-diphenylmethane diisocyanate, 2,4'-diphenylmethane diisocyanate and 4,4'-diphenylmethane diisocyanate, and isomeric mixtures thereof, 1,4-phenylene diisocyanate (PPDI), 1,5-naphthalene diisocyanate (NDI) and meta-xylylene diisocyanate (MXDI).

Examples of aliphatic diisocyanates that may be used in the present invention are tetramethylene diisocyanate, pentamethylene diisocyanate and hexamethylene diisocyanate (HDI).

Examples of cycloaliphatic diisocyanates that may be used in the present invention are 1,4-cyclohexane diisocyanate, isophorone diisocyanate (IPDI) and 4,4'-methylenebis (cyclo-hexyl isocyanate) (HMDI).

The chain-extending diol used to synthesize the thermoplastic elastomeric polyurethane of the present invention has a molar mass of less than 500 g/mol, preferably less than 400 g/mol and more preferentially less than 300 g/mol.

Examples of chain-extending diols that may be used in the present invention are alkanediols such as ethanediol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, neopentylglycol, 2-butyl-2-ethyl-1,3-propanediol, 2,4-diethyl-1,5-pentanediol, 3-methyl-1,5-pentanediol and 2-ethyl-1,3-hexanediol; glycol alkyl ethers such as diethylene glycol, triethylene glycol, propylene glycol, dipropylene glycol and tripropylene glycol; cycloaliphatic diols such as 1,2-cyclopentanediol, 1,4-cyclohexanedimethanol and 1,4-dihydroxycyclohexane; alkylaryl diols such as hydroquinone bis(2-hydroxyethyl) ether (HQEE), 1,4-benzenedimethanol, bisethoxybiphenol, bisphenol A ethoxylates and bisphenol F ethoxylates; heterocyclic diols such as isosorbide; and mixtures thereof.

The polymerization reaction may be performed in the presence of a catalyst. Thus, the granule of the present invention may also comprise a catalyst. The catalyst is especially chosen from organometallic catalysts based on tin, zinc or bismuth. Examples of tin-based catalysts that may be used are especially the compounds of formula $R_nSnX_m$ in which R is an alkyl group containing between 1 and 10 carbon atoms; X is a carboxylate group derived from a carboxylic acid containing 1 to 20 carbon atoms; n is equal to 1, 2 or 3; m is equal to 1, 2 or 3; and n+m=4; such as dibutyltin dilaurate or butyltin tris(2-ethylhexanoate). Examples of zinc-based catalysts that may be used are especially zinc bis(2-ethylhexanoate) and linear or branched fatty acid zinc salts containing 2 to 20 carbon atoms. An example of a bismuth-based catalyst that may be used is especially bismuth trisneodecanoate. The amount of catalyst used is between 0.001% and 1% and preferably between 0.005% and 0.5% by weight relative to the total weight of the constituents of the granule.

The polymerization reaction may optionally be performed in the presence of an additive. Thus, the granule of the present invention may also comprise an additive. Examples of additives that may be used are antioxidants, UV stabilizers, degassing agents or stabilizers such as phenolic compounds of the type such as Irganox® 1010, phosphite-based compounds of the type such as Irganox® 168 or hydrolysis stabilizers such as Stabaxol®.

According to a particular embodiment, the thermoplastic elastomeric polyurethane of the present invention has a molar mass ($M_n$) of between 10 000 and 100 000 g/mol, preferably between 20 000 and 80 000 g/mol and more preferentially between 40 000 and 60 000 g/mol.

The thermoplastic elastomeric polyurethane of the present invention comprises rigid segments and flexible segments. The rigid segments originate from the urethane bonds and from the chain-extending diol, whereas the flexible segments originate from the long chain of the polyol.

The content of rigid segments (weight % of diisocyanate + weight % of chain-extending diol relative to the weight of the polyurethane) is between 5% and 40%, preferably between 10% and 30% and more preferentially between 15% and 25%, and the content of flexible segments (weight % of polyol relative to the weight of the polyurethane) is between 60% and 95%, preferably between 70% and 90% and more preferentially between 75% and 85%.

The thermoplastic elastomeric polyurethane of the present invention has a glass transition temperature (Tg) of between −60° C. and 0° C., preferably between −55° C. and −10° C. and more preferentially between −50° C. and −20° C.

According to a particularly preferred embodiment, the thermoplastic elastomeric polyurethane of the present invention comprises two glass transition temperatures. Thus, the polyurethane may have a first Tg (associated with the flexible segments) of between −60° C. and 0° C., preferably between −55° C. and −10° C. and more preferentially between −50° C. and −20° C., and a second Tg (associated with the rigid segments) of between 75° C. and 125° C., preferably between 85° C. and 115° C. and more preferentially between 95° C. and 105° C.

The granule that is the object of the present invention has very advantageous properties when compared with a pure thermoplastic elastomeric polyurethane granule. Indeed, the granule according to the invention has a lower melting point than a granule comprising only polyurethane. Thus, the use of granules according to the invention advantageously makes it possible to reduce the temperature of the bitumen into which the granules are introduced and to shorten the mixing time required for the preparation of a bituminous binder when compared with the use of pure polyurethane granules. Thus, there is no oxidation or thermal degradation of the polyurethane during the preparation of the bituminous binder.

The granule that is the object of the present invention may especially have a melting point of between 100 and 200° C., preferably between 120 and 190° C. and more preferentially between 130 and 170° C.

Furthermore, the granule according to the invention has a melt flow index (MFI under conditions of 190° C./3.8 kg) higher than that of a granule comprising only polyurethane. The melt flow index of a material reflects the capacity of the material to flow when hot. Thus, the granules of the present invention flow much better when hot than granules of pure polyurethane, which advantageously makes it possible to shorten the mixing time required for the preparation of a bituminous binder when compared with the use of granules of pure polyurethane.

The granule that is the object of the present invention may especially have a melt flow index (190° C./3.8 kg) of between and 500, preferably between 80 and 300 and more preferentially between 100 and 200.

According to a preferential embodiment, the thermoplastic elastomeric polyurethane of the granule that is the object of the present invention is synthesized in an extruder in the presence of bitumen. This process for preparing the granule is detailed below.

Process for Preparing the Granule

The process for preparing the granule comprising a thermoplastic elastomeric polyurethane dispersed in bitumen is performed by carrying out the polymerization reaction of said polyurethane in an extruder in the presence of bitumen. This preparation process is also referred to as reactive extrusion synthesis.

All of the characteristics described for the granule that is the object of the present invention apply to the granule obtained via the process according to the present invention.

Extruders are conventionally used for the transformation of polymers. They are composed mainly of one or more endless screws which rotate inside a sheath, thus allowing blending of the polymers introduced. Thus, the extrusion process is generally used for the purposes of mixing and forming materials. This process is also used for polymerization reactions in which the extruder then serves as a polymerization reactor, and in this case this is referred to as reactive extrusion. This advantageously makes it possible to use a continuous process instead of a discontinuous process and thus to increase the industrial rates and the homogeneity of the production. Furthermore, given that the reagents are very easily placed in contact in the extruder, the reactive extrusion process is very frugal in terms of energy and of amounts of materials. What is more, reactive extrusion allows control of the reaction kinetics and an improvement in the yields obtained. Finally, given that the reaction is confined in the extruder, this process affords better protection to man and the environment when compared especially with discontinuous mixers or reactors, which have the drawback of simultaneously using large amounts of sensitive material.

For the purposes of the present invention, the term "extruder" combines the following devices: single-screw extruders, multi-screw extruders especially such as co- or counter-rotating twin-screw extruders, planetary extruders, annular extruders and static or intensive mixers.

According to a preferred embodiment, the extruder used in the process of the invention is a co-rotating twin-screw extruder.

The process that is the object of the present invention makes it possible to prepare a granule which comprises:
  from 5 to 70%, from 10% to 70%, from 15% to 50%, from 20% to 40% by weight of bitumen relative to the weight of the granule;
  from 95 to 30%, from 90% to 30%, from 85% to 50%, from 80% to 60% by weight of thermoplastic elastomeric polyurethane relative to the weight of the granule.

According to a preferred embodiment, the process that is the object of the present invention comprises the following steps:
  introduction of the polyol, the diisocyanate, the chain-extending diol and optionally a catalyst, an additive or a filler into an extruder;
  introduction of the bitumen into the extruder;
  chopping of the extrudate into granules at the extruder outlet.

According to another embodiment, the process that is the object of the present invention comprises the following steps:
  preparation of a prepolymer by reaction between the polyol and the diisocyanate;
  introduction of the prepolymer, the chain-extending diol and optionally a catalyst, an additive or a filler into an extruder;
  introduction of the bitumen into the extruder;
  chopping of the extrudate into granules at the extruder outlet.

The step of preparing the prepolymer by reaction between the polyol and the diisocyanate is performed outside the extruder. This step may be performed under the usual conditions, for example by stirring under an inert atmosphere in a reactor for 45 to 120 minutes at a temperature of 80 to 90° C.

According to a particular embodiment, the polyol may be heated before being introduced into the extruder. For example, the polyol may be heated to a temperature of between 80 and 150° C.

According to a preferred embodiment, the diisocyanate is introduced into the extruder in liquid form. Thus, it is preferable to melt the diisocyanate before it is introduced into the extruder.

The step of introduction of the polyol, the diisocyanate, the chain-extending diol and optionally the catalyst and/or the additive and/or the filler into the extruder and the step of introducing the prepolymer, the chain-extending diol and optionally the catalyst and/or the additive and/or the filler into the extruder may be performed in several ways. Each reagent may be introduced separately into the extruder, or alternatively all the reagents may be premixed together and then introduced into the extruder, or alternatively certain reagents are introduced separately and others are premixed together before being introduced into the extruder. Preferably, the polyol and the diisocyanate are introduced separately, and the chain-extending diol is introduced as a mixture with the catalyst and/or the additive and/or the filler.

The flow rate of each reagent or reagent mixture introduced into the extruder may advantageously be controlled with volumetric pumps.

According to a preferred embodiment, the temperature of the extruder zone into which the polyol and the diisocyanate or the prepolymer, the chain-extending diol and optionally the catalyst are introduced is between 200 and 260° C., preferably between 210 and 250° C. and more preferentially between 220 and 230° C.

The bitumen may be introduced into the extruder at the same time or downstream of the extruder zone into which the polyol and the diisocyanate or the prepolymer, the chain-extending diol and optionally the catalyst and/or the additive and/or the filler are introduced. Preferably, the bitumen is introduced into the extruder downstream of the extruder zone into which the polyol and the diisocyanate or the prepolymer, the chain-extending diol and optionally the catalyst and/or the additive and/or the filler are introduced. For example, the bitumen may be introduced into the middle of the extruder.

According to a preferred embodiment, the temperature of the extruder zone into which the bitumen is introduced is between 170 and 220° C., preferably between 180 and 210° C. and more preferentially between 190 and 200° C.

The step of chopping the extrudate into granules at the extruder outlet may especially be performed with one or more knives at the extruder outlet under a stream of cold water.

According to a preferred embodiment, the extruder outlet is a die which comprises one or more holes of circular cross section, and preferably the die comprises two holes of circular cross section.

According to another preferred embodiment, the chopping step is performed with four rotating knives.

According to yet another preferred embodiment, the temperature of the stream of water is between 5° C. and 15° C. and preferably between 8 and 12° C.

According to another preferred embodiment, the stream of cold water may comprise an anti-adhesive agent and/or the granules are covered with an anti-adhesive agent after the chopping step. Anti-adhesive agents that may be used in the present invention are talc, calcium/zinc stearate, fumed silica.

The process according to the invention may optionally comprise a step of drying the granules after the step of chopping the extrudate into granules. According to a particular embodiment, the granules are dried at a temperature of between 50 and 90° C., and preferably between 60 and 80° C. for a time of between 1 hour and 3 hours and preferably between 1 hour 30 minutes and 2 hours 30 minutes. According to a preferred embodiment, there is no reagglomeration of the bitumen during the granule drying step.

Use of the Granule

The granule that is the object of the present invention may especially be used for preparing a bituminous binder by adding said granule to the hot bitumen. Said bituminous binder obtained comprises bitumen, a thermoplastic elastomeric polyurethane and optionally an oil and/or a filler and/or an additive and/or a catalyst.

For example, the granule of the present invention may be used for preparing a bituminous binder having the following composition, the percentages being weight percentages based on the total weight of the composition:
- 40% to 90% and preferably 60% to 80% of bitumen;
- 10% to 50% and preferably 15% to 40% of thermoplastic elastomeric polyurethane;
- 0 to 10%, preferably 0 to 5% and more preferentially 0 to 3% of oil;
- 0 to 50%, preferably 0 to 40% and more preferentially 0 to 20% of filler;
- 0 to 20% of additive; and
- 0 to 0.5% of catalyst.

Thus, the invention also relates to a process for preparing a bituminous binder, comprising the incorporation of the granules described previously into a composition comprising liquid bitumen and optionally one or several compound(s) chosen from the group consisting of an oil, a filler, an additive and a catalyst.

According to an advantageous embodiment, the bitumen into which the granules are introduced may be a bitumen that is incompatible with polyurethanes, especially such as bitumens with a very high asphaltene content (>25% by weight based on the weight of the bitume), such as certain bitumens of grades 70/100 or 35/50.

The optional oil and/or filler and/or additive may be added before, during or after the addition of the granule to the hot bitumen. Preferably, the optional oil and/or filler and/or additive are added after the addition of the granule. Oils that may be added to the binder are naphthenic oils such as Ruetasolv® DI or NYTEX 820. Fillers that may be added to the binder are mineral or organic fillers such as calcium carbonate, silica, talc, dolomite, kaolin, carbon black, and mixtures thereof. Additives that may be added to the binder are flame-retardant agents such as colemanite or root-penetration preventers such as Preventol® B5.

The use of the granule of the present invention for preparing a bituminous binder advantageously makes it possible to reduce the temperature of the bitumen into which the granules are added when compared with the use of granules of pure polyurethane. Thus, the granules may be added to a bitumen heated to a temperature below 170° C., preferably below 160° C. and more preferentially below 150° C.

The use of the granule of the present invention for preparing a bituminous binder advantageously makes it possible to reduce the mixing time required for obtaining a homogeneous bituminous binder without unmelted components when compared with the use of granules of pure polyurethane. Thus, the time required to obtain a homogeneous mixture is less than 45 minutes, preferably less than 35 minutes and more preferentially less than 25 minutes. Furthermore, the use of the granule of the present invention for preparing a bituminous binder does not result in any significant changes either in the ring-and-ball temperature (Trb) or in the cold pliability of the formulated binder. Thus, the Trb of a bituminous binder formed with granules of the present invention is equal to the Trb ± 10° C. and preferably Trb ± 5° C. of a binder formulated with granules of pure polyurethane of the same composition. The ring-and-ball temperature corresponds to the softening point of the bituminous binder and is measured according to the method described below.

According to a particular embodiment, the bituminous binder obtained using the granule of the present invention is deposited onto a fibrous support to form a prefabricated sealing membrane. The bituminous binder may especially be deposited onto the fibrous support by coating, for example with a scraper, and the fibrous support may then be impregnated to the core with the bituminous binder, for example by passing the coated fibrous support through a calender roll.

The sealing membrane obtained is especially in the form of a roll which can be unrolled onto the surface to be rendered leaktight and the various strips of membranes are then welded together with a blowtorch or with hot air.

According to another embodiment, the bituminous binder obtained using the granule of the present invention is used as a road-covering binder.

The invention will be described in greater detail with the aid of the examples that follow, which are given for purely illustrative purposes.

EXAMPLES

In the description and the examples below, the following methods were used for measuring the glass transition temperature, the melting point, the melt flow index MFI (190° C./3.8 kg) and the ring-and-ball temperature.

Glass transition temperature: The glass transition temperature is measured with a differential scan calorimetry (DSC) machine by performing the following cycles at 10° C./min:
Cycle 1: temperature increase from room temperature to 250° C.;
Cycle 2: temperature decrease to −80° C.;
Cycle 3: temperature increase to 250° C.
Only the third cycle is used for measuring the Tg.

Melting point: The melting point is measured with a Kofler bench and corresponds to the temperature for which the product is completely liquid.

Melt flow index (190° C./3.8 kg): The melt flow index is measured according to standard ASTM D1238 with a melt flow indexer, which consists in melting 3.8 kg of material at 190° C. and in measuring the flow of this material through a calibrated die under a calibrated weight.

Ring-and-ball (Trb) temperature: The Trb is measured according to standard NF EN 1427, June 2007. The material to be tested is placed in copper rings. The rings are placed in a Trb-meter. A metal ball is placed on the surface of the rings, which are heated until the balls pass through the ring. The temperature at which the balls pass through is the Trb.

Example 1

Process for Preparing Granules According to the Invention

Figure 1:
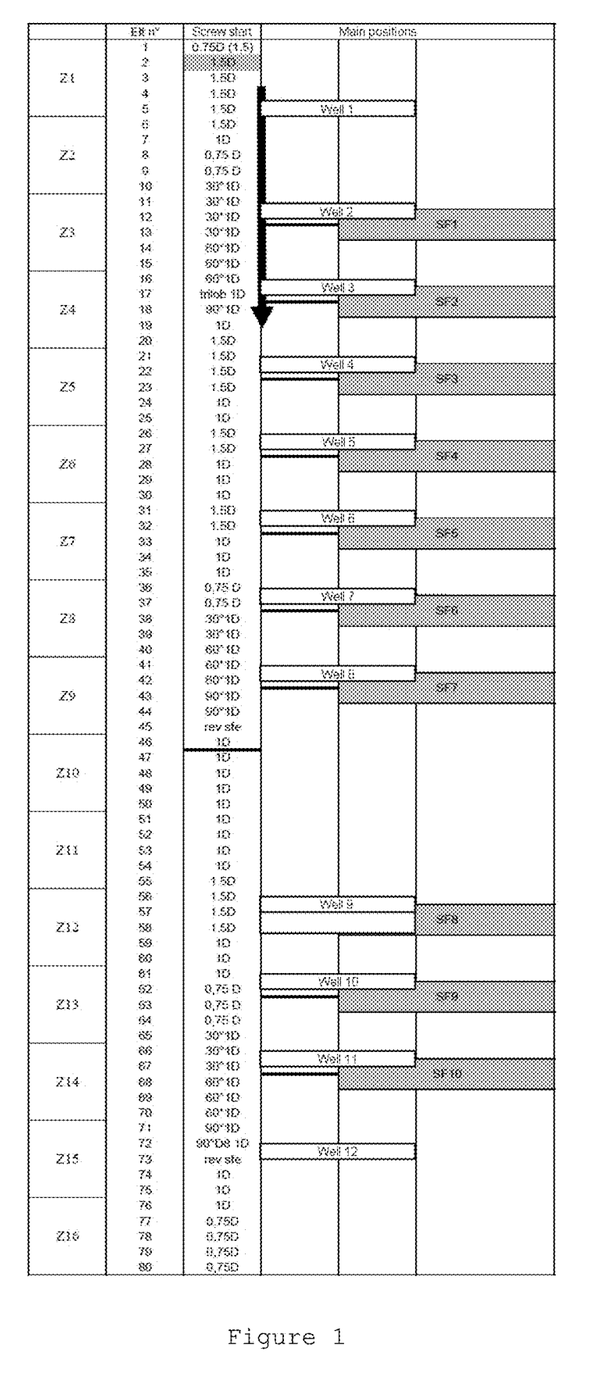
FIG. 1 illustrates the screw profile for the process for preparing the granules of the disclosure.

The extruder used for preparing the granules is a co-rotating twin-screw extruder with a diameter of 32 mm and a length/diameter ratio of 80. The screw profile is found in FIG. 1.

In all the examples, the following constituents are used:
Polyols:
  polyester polyol of $C_{18}$ fatty acid dimer type with a molar mass of 3000 g/mol sold under the commercial reference Radia® 7285 by OLEON
  polyester polyol of $C_{18}$ fatty acid dimer type with a molar mass of 3000 g/mol sold under the commercial reference Priplast® 3196 by CRODA
  polyether polyol of polytetrahydrofuran type with a molar mass of 2000 g/mol (referred to hereinbelow as PTHF 2000)
Chain-extending Diol:
  1,4-butanediol (referred to hereinbelow as BDO)
Diisocyanate:
  4,4'-diphenylmethane diisocyanate sold under the commercial reference Suprasec® 1306 by HUNTSMAN (referred to hereinbelow as MDI)

Figure 2:
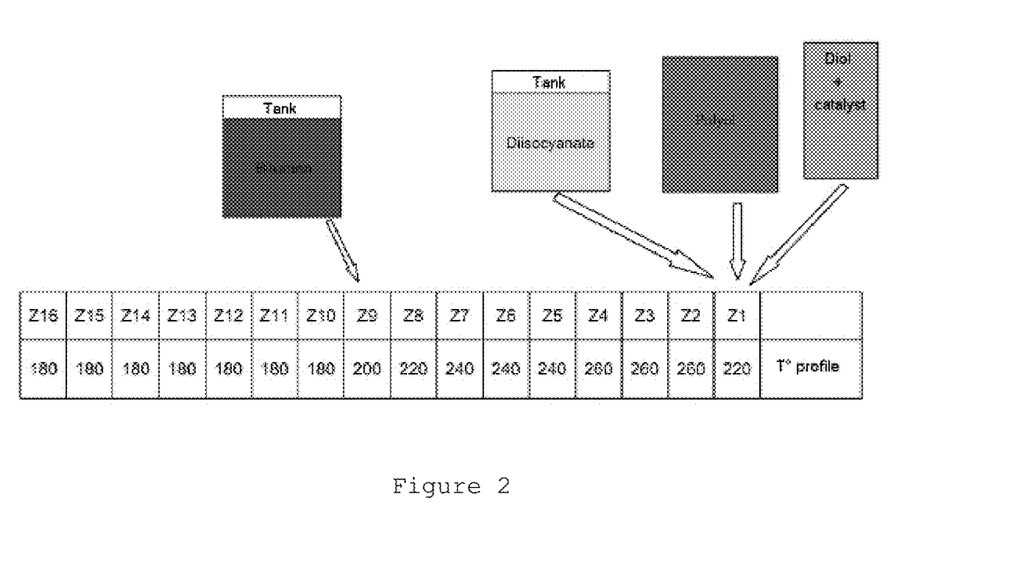
FIG. 2 illustrates the temperature profile of the extruder used in the process for preparing the granules of the disclosure.

Catalyst:
  dibutyltin dilaurate sold under the commercial reference DABCO® T-12N by AIR PRODUCTS
Bitumen:
  bitumen 1: bitumen of grade 160/220 sold under the commercial reference B200K by the Karlsruhe refinery
  bitumen 2: bitumen of grade 70/100 sold by the Godorf refinery.
The operating conditions are as follows:
  The polyol is stored at 100° C. The polyol is introduced into the extruder at zone Z1 with a pump of volume 6 cm³/turn.
  The chain extender and the catalyst are premixed by adding 50 ppm of catalyst to the diol. The mixture is introduced into the extruder at zone Z1 using a pump of volume 0.6 cm³/turn.
  The diisocyanate is premelted at 60° C. The diisocyanate is introduced into the extruder at zone Z1 using a pump of volume 1.2 cm³/turn.
  The bitumen is heated to 120° C. and then introduced into zone Z9 of the extruder using a thermostatically-regulated pump.
  The temperature profile in the extruder is indicated in FIG. 2.
  At the extruder outlet (zone Z16) the parameters of the granulation head under water are as follows:
    water temperature of 10° C.;
    use of 4 meters long pipes and of anti-adhesive agent (1% to 2%) in the water;
    die of diameter 2.8 mm with two holes (4 knives thick).
  The granules are treated with talc.
  The granules are dried for 2 hours at 70° C.

Table 1 below indicates the content of hard segments and the NCO/OH ratio obtained. The flow rates of each constituent are adjusted to obtain the indicated contents of hard segments and NCO/OH ratios.

TABLE 1

| Test | Reagents | Content of hard segments | NCO/OH ratio |
|---|---|---|---|
| 1 | Radia ® 7285<br>MDI<br>BDO | 17% | 0.958 |
| 1' | Radia ® 7285<br>MDI<br>BDO<br>Bitumen 1 | 17% | 0.958 |
| 2 | Radia ® 7285<br>MDI<br>BDO | 21% | 0.954 |
| 2' | Radia ® 7285<br>MDI<br>BDO<br>Bitumen 1 | 21% | 0.954 |
| 3 | Priplast ® 3196<br>MDI<br>BDO | 17% | 0.957 |
| 3' | Priplast ® 3196<br>MDI<br>BDO<br>Bitumen 1 | 17% | 0.957 |
| 4 | PTHF 2000<br>MDI<br>BDO | 22% | 0.970 |
| 4' | PTHF 2000<br>MDI<br>BDO<br>Bitumen 1 | 22% | 0.970 |

Table 2 below gives the melting points and the melt flow indices (190° C./3.8 kg) of the granules obtained according to the tests of Table 1.

TABLE 2

| Test | Reagents | Content of hard segments | NCO/OH ratio | Melting point (° C.) | Melt flow index (190° C./3.8 kg) |
|---|---|---|---|---|---|
| 1 | Radia ® 7285<br>MDI<br>BDO | 17% | 0.958 | 176 | 52.4 |
| 1' | Radia ® 7285<br>MDI<br>BDO<br>Bitumen 1 (25%) | 17% | 0.958 | 148 | 258 |
| 2 | Radia ® 7285<br>MDI<br>BDO | 21% | 0.954 | 177 | 78.3 |
| 2' | Radia ® 7285<br>MDI<br>BDO<br>Bitumen 1 (25%) | 21% | 0.954 | 159 | 298.3 |
| 3 | Priplast ® 3196<br>MDI<br>BDO | 17% | 0.957 | 160 | 99.7 |
| 3' | Priplast ® 3196<br>MDI<br>BDO<br>Bitumen 1 (25%) | 17% | 0.957 | 142 | 339.1 |
| 4 | PTHF 2000<br>MDI<br>BDO | 22% | 0.970 | 158 | 60.6 |
| 4' | PTHF 2000<br>MDI<br>BDO<br>Bitumen 1 (25%) | 22% | 0.970 | 100 | 191.7 |

The granules comprising bitumen according to the invention (tests 1', 2', 3' and 4') have a lower melting point and a higher melt flow index than the corresponding granules of pure polyurethane (tests 1, 2, 3 and 4).

Example 2

Use of the Granules According to the Invention for Preparing a Bituminous Binder Bituminous binders having the compositions described in Table 3 below are prepared, in a thermostatically-regulated blender, according to the following process: the bitumen heated to 175° C. is introduced, then the granules are introduced. The fillers are then introduced into the blender.

Table 3 below gives the mixing time required to obtain a homogeneous binder without unmelted components and the ring-and-ball temperatures (Trb) of the binders.

TABLE 3

| Test | Composition of the binder (weight %) | Time required to obtain a homogeneous binder (min) | Trb (° C.) |
|---|---|---|---|
| L1 | Bitumen 1: 49%<br>Granules 1: 21%<br>CaCO₃: 30% | 58 | 148 |
| L1' | Bitumen 1: 49%<br>Granules 1': 21%<br>CaCO₃: 30% | 35 | 147 |
| L2 | Bitumen 1: 49%<br>Granules 3: 21%<br>CaCO₃: 30% | 30 | 153 |

TABLE 3-continued

| Test | Composition of the binder (weight %) | Time required to obtain a homogeneous binder (min) | Trb (° C.) |
|---|---|---|---|
| L2' | Bitumen 1: 49%<br>Granules 3': 21%<br>CaCO$_3$: 30% | 28 | 148 |
| L3 | Bitumen 1: 49%<br>Granules 4: 21%<br>CaCO$_3$: 30% | 40 | 140 |
| L3' | Bitumen 1: 49%<br>Granules 4': 21%<br>CaCO$_3$: 30% | 31 | 140 |
| L4 | Bitumen 1: 55%<br>Granules 4: 45% | 65 | 152 |
| L4' | Bitumen 1: 55%<br>Granules 4': 45% | 35 | 152 |

The binders formulated with the granules comprising bitumen according to the invention (tests L1', L2', L3' and L4') are homogeneous more rapidly than the binders obtained with the corresponding granules of pure polyurethane (tests L1, L2, L3 and L4). The ring-and-ball temperatures are almost identical for the binders formulated with the granules comprising bitumen according to the invention and the binders obtained with the corresponding granules of pure polyurethane.

Example 3

Compatibilisation of Thermoplastic Polyurethane in a Bitumen Having a High Asphaltene Content Bituminous binders having the compositions described in Table 4 below are prepared, in a thermostatically-regulated blender, according to the following process: the bitumen heated to 175° C. is introduced, then the granules are introduced. The fillers are then introduced into the blender.

TABLE 4

| Test | Composition of the binder (weight %) | Trb (° C.) |
|---|---|---|
| L5' | Bitumen 1: 42%<br>Granules 1': 28%<br>CaCO$_3$: 30% | 137 |
| L6' | Bitumen 2: 49%<br>Granules 1': 21%<br>CaCO$_3$: 30% | 134 |

Binder L6' is formulated with bitumen 2 that is less compatible with granules of pure polyurethane because it exhibits an asphaltene content higher than that of bitumen 1. Nevertheless, when granules comprising bitumen according to the invention are used, no compatibilisation problems were observed for binder L6'. Indeed, binder L6' has a ring-and-ball temperature that is almost identical to that of binder L5'.

What is claimed is:

1. A granule, wherein said granule comprises a thermoplastic elastomeric polyurethane and bitumen, wherein said thermoplastic elastomeric polyurethane has a glass transition temperature (Tg) of between −60° C. and 0° C. and is obtained by reaction between:
a polyol having a functionality of between 1.75 and 2.2, and a molar mass of between 500 and 6000 g/mol;
a diisocyanate; and
a chain-extending diol with a molar mass of less than 500 g/mol;
with an NCO/OH ratio of between 0.9 and 1.02.

2. A granule according to claim 1, wherein said granule comprises:
5% to 70% by weight of bitumen relative to the weight of the granule;
95% to 30% by weight of thermoplastic elastomeric polyurethane relative to the weight of the granule.

3. A granule according to claim 1, wherein the polyol is chosen from a polyether polyol, a polyester polyol, a polycarbonate polyol, a polyolefin polyol, a polyol based on plant oil, and mixtures thereof.

4. A granule according to claim 1, wherein the diisocyanate is chosen from aromatic, aliphatic and cycloaliphatic diisocyanates, and mixtures thereof.

5. A granule according to claim 1, wherein said granule has a melting point of between 100 and 200° C.

6. A granule according to claim 1, wherein said granule has a melt flow index (190° C./3.8 kg) of between 50 and 500.

7. A granule according to claim 1, wherein the thermoplastic elastomeric polyurethane is synthesized by reactive extrusion in the presence of bitumen.

8. A process for preparing a granule of thermoplastic elastomeric polyurethane dispersed in bitumen, wherein said polyurethane has a glass transition temperature (Tg) of between −60° C. and 0° C. and is obtained by polymerization reaction between:
a polyol having a functionality of between 1.75 and 2.2, and a molar mass of between 500 and 6000 g/mol;
a diisocyanate; and
a chain-extending diol with a molar mass of less than 500 g/mol;
with an NCO/OH ratio of between 0.9 and 1.02;
said polymerization reaction being performed in an extruder in the presence of bitumen.

9. A process according to claim 8, wherein said granule comprises:
5% to 70% by weight of bitumen relative to the weight of the granule;
95% to 30% by weight of thermoplastic elastomeric polyurethane relative to the weight of the granule.

10. A process according to claim 8, wherein said process comprises the following steps:
introduction of the polyol, the diisocyanate, the chain-extending diol into an extruder;
introduction of the bitumen into the extruder;
chopping of the extrudate into granules at the extruder outlet.

11. A process according to claim 8, wherein said process comprises the following steps:
preparation of a prepolymer by reaction between the polyol and the diisocyanate;
introduction of the prepolymer, the chain-extending diol into an extruder;
introduction of the bitumen into the extruder;
chopping of the extrudate into granules at the extruder outlet.

12. A process for preparing a bituminous binder, comprising incorporating the granules of claim 1 into a composition comprising liquid bitumen.

13. A process for preparing a prefabricated sealing membrane, comprising depositing the bituminous binder prepared according to claim 12 onto a fibrous support.

14. A process for preparing a bituminous binder, comprising incorporating granules prepared according to claim 8 into a composition comprising liquid bitumen.

15. A process for preparing a prefabricated sealing membrane, comprising depositing the bituminous binder prepared according to claim 14 onto a fibrous support.

* * * * *